United States Patent [19]
Bechtel et al.

[11] Patent Number: 5,936,340
[45] Date of Patent: Aug. 10, 1999

[54] DISPLAY SCREEN COMPRISING AN ADHESIVE LAYER

[75] Inventors: Helmut Bechtel, Roetgen; Stefan Gruhlke, Aachen; Markus Haase, Aachen; Joachim Opitz, Aachen, all of Germany

[73] Assignee: U.S. Philips Corporation, New York, N.Y.

[21] Appl. No.: 08/878,719

[22] Filed: Jun. 19, 1997

[30]     Foreign Application Priority Data

Jun. 28, 1996 [DE] Germany .................. 196 25 991

[51] Int. Cl.⁶ .................................................. H01J 29/10
[52] U.S. Cl. ........................... 313/461; 313/466; 313/473
[58] Field of Search ................................ 313/461, 462, 313/463, 466, 473

[56]     References Cited

FOREIGN PATENT DOCUMENTS 3600630  7/1987  Germany ................ H01J 9/227

*Primary Examiner*—Vip Patel
*Attorney, Agent, or Firm*—John C. Fox

[57]     ABSTRACT

A display screen, in particular a flat display screen, having a glass face plate with a transparent electrode layer of a metal oxide, for example indium-doped tin oxide (ITO), a phosphor layer and an adhesive intermediate layer of an alkali silicate between the electrode layer and the phosphor layer.

4 Claims, No Drawings

DISPLAY SCREEN COMPRISING AN ADHESIVE LAYER

BACKGROUND OF THE INVENTION

The invention relates to a display screen, in particular a flat display screen, comprising a glass face plate with a transparent electrode layer of a metal oxide, for example indium-doped tin oxide (ITO), and a phosphor layer.

In the case of conventional display screens, the inner surface of the glass face plate is coated with one or more structured phosphor layers, which each contain a phosphor in accordance with a dot or stripe pattern. In the case of color display screens, the pattern is formed by triplets of vertical stripes or triangularly arranged dots. Said triplets each comprise phosphor dots, which each emit one of the three primary colors red, blue and green. These phosphor layers are provided by means of a photolithographic process. They are coated with a thin aluminium layer, which serves to remove the exciting electrons.

In the case of flat display screens, use is often made of a construction principle which replaces the aluminium layer by a transparent electrode layer, which is provided on the glass face plate and on which the phosphor layers are situated. The transparent electrode layer generally consists of a transparent, electroconductive layer of indium-doped tin oxide (ITO) or other metal oxides, having a thickness of several nm to several $\mu$m.

In conventional display screens, the glass surface is pre-treated in order to obtain a firm connection with sufficient adhesive strength between the glass surface of the face plate and the phosphor layers. This pre-treatment generally comprises two process steps. In a first process step, the glass surface is etched with diluted hydrofluoric acid to clean said surface and to obtain surface-active, adhesive groups, such as silanol groups (—Si—OH) or siloxane groups (—Si—O—Si—). In a second process step, a so-called pre-coating is provided which is composed of a diluted polyvinyl-alcohol solution.

In the case of ITO-coated glass surfaces, such a pre-treatment does not have the desired effect because, unlike silicon oxide, tin oxide does not form adhesive, surface-active groups. The same applies to coatings of other metal oxides which do not form adhesive, surface-active groups.

In DE-A-3600630 a description is given of a method of manufacturing a conventional display screen, in which first a PVA-containing adhesive coating is applied to the glass face plate, whereafter, following a photoprinting process, the phosphor screens are provided on the adhesive coating, said adhesive coating being provided by means of an aqueous solution containing, approximately 0.05 to 1.5 wt. %, in particular 0.08 to 0.8 wt. % polyvinyl alcohol and approximately 0.1 to 2 wt. %, in particular 0.5 to 1.5 wt. % silica sol. However, this process relates to conventional display screens which do not comprise a transparent electrode layer of indium-doped tin oxide or another metal oxide.

OBJECTS AND SUMMARY OF THE INVENTION

Therefore, it is an object of the invention to provide a display screen having a glass face plate comprising a transparent electrode layer of a metal oxide and a phosphor layer, which display screen is characterized by a large adhesive strength between the transparent electrode layer and the phosphor layer.

In accordance with the invention, this object is achieved by an adhesive intermediate layer of an alkali silicate, which is provided between the transparent electrode layer and the phosphor layer.

By virtue of such an adhesive intermediate layer, a strong adhesion between the transparent electrode layer and the phosphor layer is achieved. The alkali-silicate layer can be manufactured in such a way that a very thin, transparent layer is obtained. In the manufacturing process of the display screen, said alkali-silicate layer is characterized by a very good wettability and initial adhesion.

Within the scope of the invention, the alkali silicate is preferably a sodium-containing silicate. It has been found that an adhesive intermediate layer of a sodium silicate is characterized by a very good initial adhesion.

It is particularly preferred that for the alkali silicate use is made of sodium metasilicate $Na_2SiO_3$. Sodium metasilicate is very soluble in water and only slightly alkaline, so that it does not chemically affect the ITO layer and the phosphor layers.

It may alternatively be preferred that the alkali silicate used is potassium metasilicate $K_2SiO_3$. Even if it is intensively exposed to UV light during the photolithographic process step, potassium metasilicate does not turn dark.

These and other aspects of the invention will be apparent from and elucidated with reference to the embodiment described hereinafter.

DESCRIPTION OF THE PREFERRED EMBODIMENTS

The inventive, adhesive intermediate layer is composed of an alkali silicate, for example a monomeric orthosilicate such as $Na_4SiO_4$, $K_4SiO_4$, $Na_2Si_2O_5$, $K_2Si_2O_5$ or, more preferably, of chain-like metasilicates, such as $Na_2SiO_3$ and $K_2SiO_3$.

The method of manufacturing the adhesive intermediate layer is generally governed by the photolithographic method of manufacturing the phosphor layers lying above said intermediate layer. Preferably, the water-soluble polymer used in the photolithographic process is also used as an intermediary binder for the alkali-silicate layer. The phosphors are generally provided in a suspension of the polyvinyl alcohol/ammonium dichromate photoresist, whereafter they are structured by photolysis. In this case, also the adhesive intermediate layer of an alkali silicate is provided from a solution in polyvinyl alcohol and water.

The PVA/ADC photoresist system may alternatively be replaced by other photoresist systems containing other water-soluble photosensitive polymers, such as PVA derivatives having chromophoric side groups, which bring about cross-linking, such as polyvinyl alcohol with stilbazolium groups (PVA-SBQ), polyvinyl alcohol with styryl-quinolinium groups, polyvinyl alcohol with styryl-dimethylthiazolium groups, polyvinyl alcohol with N-(1-pyridinio)benzamidate groups (PDA-PB), polyvinyl cinnamate, polyvinyl azidobenzacetal, polymeric azides, and such. In this case, the alkali-silicate layer is preferably applied with the same water-soluble, photosensitive polymer as the phosphor layer. Intermediary polymerizates, which bring about the initial adhesion to the ITO surface, are formed between the alkali silicate and the polymer.

The adhesive intermediate layer of an alkali silicate may alternatively be applied by means of another organic polymeric binder, which is burned out during the concluding burn-in process of the display screen.

The display screen in accordance with the invention, comprising the adhesive intermediate layer of alkali silicate, is manufactured by means of the following process steps:

coating the glass face plate with a transparent electrode layer of indium-doped tin oxide (ITO) or another metal oxide, cleaning the surface of the electrode layer, providing an aqueous solution of alkali silicate and a water-soluble, photo-sensitive polymer or an organic, polymeric binder, which solution comprises the polymer and the alkali silicate in a weight ratio ranging from 10:1 to 1:10, by dip-coating, spraying, roll-coating, spin-on-coating or printing, removing excess solution by centrifuging, drying at 40° C., manufacturing one or more phosphor layers by means of a wet-chemical, photolithographic process, such as patch-coating, flow-coating and the like, drying at 40° C., exposing to UV light, developing the exposed layer, for example by rinsing under pressure, drying at 40° C., burning-in the coating at 400° C., while burning out the organic polymers.

The adhesive intermediate layer of alkali silicate can very readily be wetted and brings about a substantially improved initial adhesion of the phosphor layers to the substrate. By virtue thereof, in the subsequent photolithographic process, in which the phosphor material is provided, the quantity of photoresist, i.e. generally polyvinyl alcohol-ammonium dichromate (PVA-ADC), can be reduced without the adhesive strength of the phosphor dots or lines being adversely affected, for example, during rinsing off the developed phosphor layers. A reduction to 10% of the customary PVA-ADC quantity is possible.

This results in an also substantially reduced quantity of "dead" layers comprising $Cr_2O_3$ formed from ADC in the finished display screen coating. These "dead" layers absorb electrons without generating luminescence. Consequently, the display screens having a reduced $Cr_2O_3$-content, which are coated in accordance with the invention, can be operated at a lower exciting voltage than display screens in accordance with the prior art.

EXAMPLE

The manufacture of the display screen is based on an 17" glass face plate, which is composed of a 2 mm thick glass plate on which an approximately 100 nm thick ITO layer is provided by sputtering. This face plate including the electrode layer is washed with de-ionized water for one hour. A coating solution of 0.1 wt. % PVA and 0.1 wt. % $Na_2SiO_3$ of a 10% PVA-solution and a 10% $Na_2SiO_3.5H_2O$-solution in water is prepared and used as the adhesive intermediate layer. A quantity of 50 ml of this coating solution are applied by spin-coating at 200 rpm. The face plate thus coated is dried at 40° C. for 10 minutes. Subsequently, a patch-coating process is carried out in which, in succession, a black-matrix layer, the green, the red and the blue phosphor layers are provided, exposed and developed. Finally, the layers are burned-in at 400° C., in which process the organic binder PVA is burned out.

We claim:

1. A display screen having a glass face plate comprising a transparent electrode layer of a metal oxide, a phosphor layer and an adhesive intermediate layer of an alkali silicate, which is provided between the electrode layer and the phosphor layer.

2. A display screen as claimed in claim 1, characterized in that the alkali silicate is a sodium-containing silicate.

3. A display screen as claimed in claim 1, characterized in that the alkali silicate is sodium metasilicate $Na_2SiO_3$.

4. A display screen as claimed in claim 1, characterized in that the alkali silicate is potassium metasilicate $K_2SiO_3$.

* * * * *